Nov. 4, 1969  D. G. NOERR, JR  3,476,192

CLUTCH FOR ROTARY HAMMER

Filed Oct. 9, 1967

INVENTOR
DONALD G. NOERR, JR.

AGENT

United States Patent Office 3,476,192
Patented Nov. 4, 1969

3,476,192
CLUTCH FOR ROTARY HAMMER
Donald G. Noerr, Jr., South Waverly, Pa., assignor to Ingersoll-Rand Company, New York, N.Y., a corporation of New Jersey
Filed Oct. 9, 1967, Ser. No. 673,546
Int. Cl. E21c 5/16; B23q 5/46
U.S. Cl. 173—12                                    7 Claims

ABSTRACT OF THE DISCLOSURE

A unidirectional clutch, for a rotary hammer, communicating rotational torque in but one direction.

---

Figure 1:
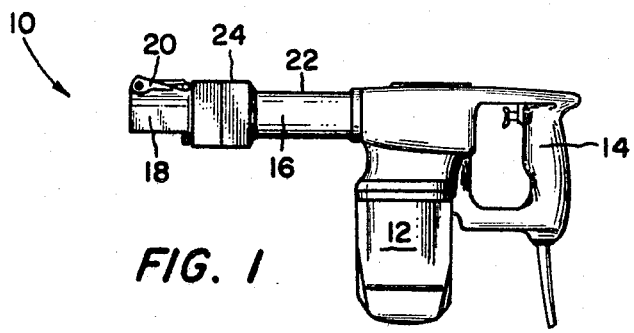

This invention pertains to arrangements for clutch coupling driving members, which together have a plurality of driving functions, with a driven member to impart said functions thereto, and in particular to such clutch-coupling arrangements having means for interrupting the imparting, therebetween, of at least one of said functions.

Clutch-coupling arrangements known in the prior art are used, for instance, to effect installation of self-drilling concrete anchors. Such known devices are used with demolition hammers. They have an impacting drive member which is coupled to a driven member; further, by means of a key and keyway, or by corresponding geometrical configuration—square, hexagonal, or whatever cross-section—the two members are slidably mated together for accommodating synchronous rotation and the drive member has an arm extending therefrom. Rotation, then, is imparted to the driven member, manually, by turning the extending arm. Hand rotation, however, is awkward and slow. It would be advantageous to be able to use a rotary demolition hammer by means of which the driven member can be impacted and also simultaneously and/or recurringly rotated. However, the difficulty with this consideration, heretofore, has been that there will occur, repeatedly, circumstances in which it is necessary or desirable to interrupt the rotation for given periods of time, to maintain the impacting while avoiding rotation, where the concrete is especially firm, or to start a new hole, or to set the plug in the anchor for installation, and like situations.

Clearly, all manner of complex designs might be engineered to effect such interrutpion of rotation. But the design complexity, the number of parts, the channeling of power, and the engage-disengage switching arrangements would be of such cost, in fabrication and maintenance, as to be prohibitive in so simple an application as that contemplated by a concrete anchor drive coupling. All that is required is some simple clutch usable with a tool having a reversible motor which provides a plurality of driving functions. Such a tool would be a rotary demolition tool, and in such the clutch would offer an uncomplicated means for interrupting at least one function of the plurality of functions, for instance, rotation.

It is an object of this invention, therefore, to provide a simple clutch usable in a tool, such as a rotary hammer, having a plurality of driving functions, by means of which all the functions of said plurality are communicated therethrough in a first mode of operation, and communication of one of the functions of said plurality is interrupted in a second mode of operation.

A feature of this invention is the disposition of a unidirectional clutch between a rotary driven member and a rotary driving member for imparting rotational torque therebetween in one rotary direction, and for interrupting the communication of rotational torque therebetween in the contrary direction.

Figure 2:
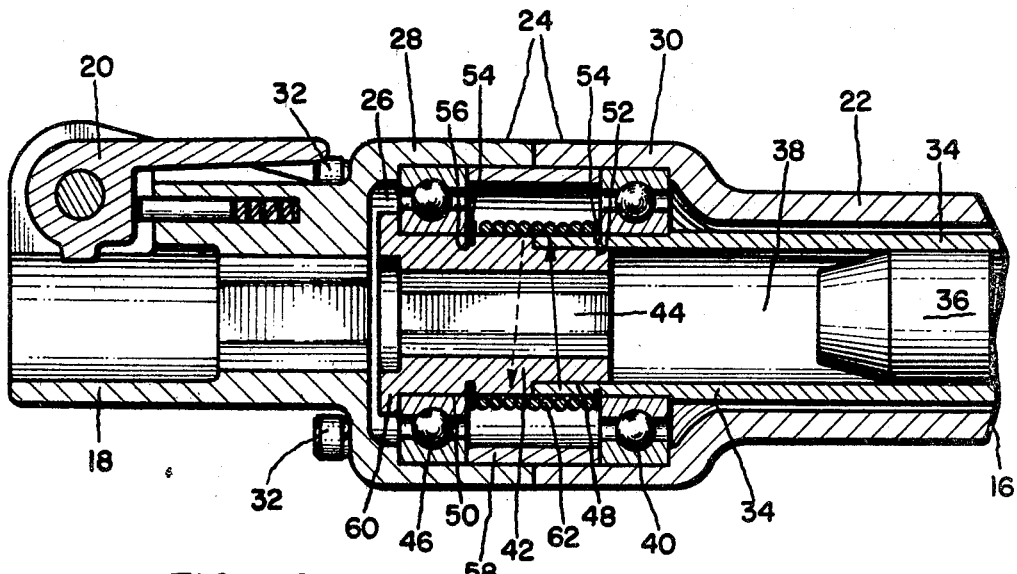

Further objects and features of this invention will become more apparent by reference to the following description, taken in conjunction with the accompanying figures, in which:

FIGURE 1 is an overall view of a tool, such as a rotary hammer, in which the novel clutch is deployed; and FIGURE 2 is a view, in cross-section, of the clutch according to the invention, the view taken along the axial center of a portion of the tool of FIGURE 1.

A preferred embodiment of the clutch according to my invention is disposed within a power tool, such as a rotary hammer, shown generally, in FIGURE 1, by the index numeral 10. The power tool comprises a motor housing 12, a hand grip and trigger portion 14, and a barrel or power take-off portion 16. Finally, the tool carries on the end thereof opposite the trigger portion a chuck portion 18, having a detent-type latching device 20, by means of which self-drilling concrete anchors, or the like, are coupled to the tool.

It is to be understood that motor housing 12 carries motor means, having reversible drive means, which provide a plurality of drive functions. Such functions comprise rotation and impacting. These means, not shown, are well known and widely used in the art to which my invention pertains, as in that aspect of the art concerned with rotary demolition tools, for instance. Accordingly, detailed disclosure thereof is not considered to be necessary here.

The power take-off portion 16 comprises a generally cylindrical section 22 which is joined to the motor housing 12, at one end thereof, and joined to a clutch housing 24 at the other end thereof. The other end of the clutch housing is joined to the generally cylindrical chuck portion 18.

Clutch housing 24 is of quadrilateral configuration externally, and defines a cylindrical chamber 26 internally. These structural features are best seen in FIG. 2. Further, clutch housing 24 is formed of two separable halves, the first half 28 is integral with chuck portion 18, and the second half 30 is integral with power take-off portion 16. The two halves are fastened together by means of four bolts 32 set in holes formed in the right-angle corners of first half 28 and threadedly torqued into tapped holes formed in the right-angle corners of second half 30.

Power take-off portion 16 carries a rotary driving member 34 and an impacting driving member 36, the two being powered by motor and drive means carried by motor housing 12. Rotary driving member 34 has an axial bore 38 to carry the impacting driving member 36. Bearing 40 disposed in clutch housing 24 mounts the rotary driving member 34 and also provides a partial support for a rotary driven member 42. Rotary driven member 42 also has an axial bore 44, coaxial with and coextensive of axial bore 38, to carry the self-drilling concrete anchor, or whatever implement is used to receive rotation and/or impacting. The axial bore 44 of rotary driven member 42 is hexagonal in cross section to receive the hexagonal shank of the implement. Driven member 42 is principally supported by a bearing 46 disposed within the clutch housing 24. The rotary driven member 42 has a first smaller outside diameter 48 within clutch housing half 30 and a second larger outside diameter 50 within clutch housing half 28 for coupling with the rotary driving member 34 as well as for mounting within the clutch housing. The smaller outside diameter 48 receives the driving end of rotary driving member 34, and the larger outside diameter 50 mounts the bearing 46 along a portion thereof. An annular groove 52 is formed within the outer surface of rotary driving member 34 near the terminal end thereof to receive a retaining ring 54 for locating the bearing 40. The rotary driven member 42 also has an annular groove 56 to receive a retaining ring 54 to locate bearing 46. Spacer 58 is disposed between the bearings 40 and 46 further to position them within the clutch housing 24. Terminal flange 60 is formed on the end of the rotary driven member 42 to secure bearing 46 against the forward retaining ring 54, the term forward being used here to indicate the chuck portion 18 end of the tool. Finally, a torque spring 62 is disposed about adjacent portions of both the rotary driving member 34 and the rotary driven member 42 for coupling therebetween and for imparting rotary motion therebetween as will be described subsequently.

The inside helical diameter of torque spring 62, unmounted and in its relaxed or quiescent state, is smaller than that represented in FIGURE 2 in its mounted condition, and smaller than the outside diameter of rotary driving member 34 and the larger outside diameter 50 of the rotary driven member. Accordingly, the torque spring 62, in being mounted thereto clasps securely to both members 34 and 42. In the embodiment shown the spring 62 is helically disposed about both members in the manner suggested by the arrows shown in FIGURE 2. The arrow shown in heavy line represents that apparent angular disposition of the half helixes on the "in view" side of spring 62 and the arrow shown in dashed line represents the angular disposition of the half helixes on the obscured side of the spring.

With clockwise rotation of the rotary driving member 34—clockwise being determined by regarding the clutch from the left in FIG. 2., i.e., looking toward impacting driving member 36 from the terminal flange 60—rotation of rotary driving member 34 will be imparted, by friction, to torque spring 62, and from the torque spring, by friction, to the rotary driven member 42. The clockwise rotation cooperates with the helical disposition of the spring 62 to carry the rotary driven member 42 in revolution; the spring 62 exhibits a tendency to reduce the diameter of its helix and close upon driving member 34 even more firmly, and so turns therewith carrying rotary driven member 42. Upon counter-clockwise rotation of the rotary driving member 34 the relationship between the spring 62 and the driving member 34 is such as to tend to enlarge the helical diameter of the spring, that is, spring 62 tends to open outwardly relative driving member 34. Therefore, in the latter circumstance, rotary driving member 34 freely slips within torque spring 62; no rotation is communicated therethrough. Thus, rotation of the driving member 34 is communicated through torque spring 62 to the rotary driven member 42 only when the driving member is rotated in clockwise direction.

In the embodiment shown it requires only the reversal of the drive means by the operator, to interrupt the rotation of rotary driven member 42.

Clearly, alternate embodiments of my novel clutch can be structured without departing from the teaching of my invention. For instance, a spring having a contrary helical lay could be used to impart rotary torque to driven member 42 upon counter-clockwise rotation of driving member 34. Alternately, in lieu of the spring 62 as the uni-directional clutch element, a ratchet and pawl, or other uni-directional device could be used in accordance with the spirit of my invention.

Impacting driving member 36, regardless of the rotation of driving member 34, is always in operative position to continue impacting upon the self-drilling concrete anchor, or whatever, carried within the rotary driven member 42. The torque spring clutch of my invention, therefore, interrupts one of a plurality of driving functions, the rotary driving function, in one mode of operation of the driving means, and communicates all the driving functions of the drive means in the alternate mode of operation.

A teaching of my invention, therefore, is of a simple clutch usable in a tool providing a plurality of driving functions, with uncomplicated means for interrupting one of the functions, that the tool might be used to install self-drilling, concrete anchors, to drive core drills, and to satisfy similar usages. With respect to the use of my novel clutch in a tool to drive core drills, an especial advantage is realized. Disengagement of the rotation can be used to start the core drill, to keep the latter from "walking" on the concrete surface, thereby accurately locating the hole; this facility eliminates the need for starter drills which must be removed before the core drill can be applied, as has been the customary practice in the field prior to the teaching of my invention.

While I have described my invention in connection with a particular embodiment it is to be clearly understood that this is done only by way of example and not as a limitation to the scope of my invention as set forth in the objects thereof and in the accompanying claims.

I claim:
1. In a tool, such as rotary hammer or the like, providing a plurality of driving functions, and having drive means capable of forward and reverse modes of operation for powering the functions of said plurality, clutch means, comprising:
   a first member for drive coupling thereof with said drive means;
   a second member; and
   means, inter-coupling said first and second members, operative for communicating only therethrough at least one driving function of said plurality only upon operation of said drive means in one of said modes.
2. The invention, according to claim 1, wherein:
   said means automatically and clutchingly engage both said first and second members upon operation of said drive means in one of said modes.
3. The invention, according to claim 1, wherein:
   said means automatically disengage at least one of said first and second members upon operation of said drive means in one of said modes.
4. The invention, according to claim 1, wherein:
   said first and second members are disposed for relative transverse motion therebetween upon operation of said drive means in one of said modes.
5. The invention, according to claim 1, wherein:
   said first and second members include means for supporting hammer and anvil components therewith.
6. The invention, according to claim 1, wherein:
   said first member includes means for supporting an oscillating hammer; and
   said second member includes means for supporting an anvil for impacting thereon by such said hammer, and for effecting rotation of such said anvil coincident with rotation of said second member.
7. The invention, according to claim 1, wherein:
   said means comprise a spring.

References Cited
UNITED STATES PATENTS

| | | | |
|---|---|---|---|
| 720,319 | 2/1903 | Box et al. | 173—109 |
| 1,163,712 | 12/1915 | Upson et al. | 173—109 |
| 1,390,834 | 9/1921 | Stage | 173—12 |
| 3,161,242 | 12/1964 | Etzkorn et al. | 173—109 |
| 3,195,704 | 7/1965 | Linsker | 173—12 X |
| 3,276,524 | 10/1966 | Falter | 173—12 X |

NILE C. BYERS, Jr., Primary Examiner